(12) United States Patent
Singh et al.

(10) Patent No.: US 11,551,124 B2
(45) Date of Patent: Jan. 10, 2023

(54) CROSS-GEOGRAPHICAL PREDICTIVE DATA ANALYSIS

(71) Applicant: Optum Technology, Inc., Eden Prairie, MN (US)

(72) Inventors: Rama Krishna Singh, Noida (IN); Ravi Pande, Noida (IN); David L. Frankenfield, Highlands Ranch, CO (US); Anupam Gupta, Gurugram (IN)

(73) Assignee: Optum Technology, Inc., Eden Prairie, MN (US)

( * ) Notice: Subject to any disclaimer, the term of this patent is extended or adjusted under 35 U.S.C. 154(b) by 265 days.

(21) Appl. No.: 16/823,573

(22) Filed: Mar. 19, 2020

(65) Prior Publication Data
US 2021/0295189 A1 Sep. 23, 2021

(51) Int. Cl.
*G06N 7/00* (2006.01)
*G06N 20/00* (2019.01)
*G06F 16/29* (2019.01)

(52) U.S. Cl.
CPC ............. *G06N 7/005* (2013.01); *G06F 16/29* (2019.01); *G06N 20/00* (2019.01)

(58) Field of Classification Search
CPC ...... G06N 7/005; G06N 20/00; G06N 3/0445; G06N 5/003; G06N 20/10; G06F 16/29
See application file for complete search history.

(56) References Cited

U.S. PATENT DOCUMENTS

| | | | |
|---|---|---|---|
| 2019/0253860 A1* | 8/2019 | Patton | G06N 20/00 |
| 2019/0340189 A1* | 11/2019 | Mehta | G06Q 10/06 |
| 2020/0068361 A1* | 2/2020 | Gratton | H04W 4/025 |
| 2020/0265236 A1* | 8/2020 | Newman | G06N 7/005 |

OTHER PUBLICATIONS

"The National Centers for Environmental Prediction: Global Weather Data for SWAT," (2 pages), [online], [Retrieved from the Internet May 15, 20205] <http://globalweather.tamu.edu/>.
"The United Nations Food and Agricultural Organization: EMPRES-i Global Animal Disease Information System," [online], [Retrieved from the Internet May 15, 2020] <http://empres-i.fao.org/eipws3g/>.

(Continued)

*Primary Examiner* — Walli Z Butt
(74) *Attorney, Agent, or Firm* — Alston & Bird LLP

(57) ABSTRACT

There is a need for more effective and efficient predictive data analysis. This need can be addressed by, for example, solutions for performing/executing cross-geographical predictive data analysis that enhance network transmission efficiency. In one example, a method includes determining forecasted superior domain event data for a hierarchically superior geographic domain at a forecasting period; determining forecasted inferior domain event data for each hierarchically inferior geographic domain associated with the hierarchically superior geographic domain at the forecasting period; determining confirmed inferior domain event data based at least in part on each hierarchically inferior geographic domain; and performing prediction-based actions based at least in part on each confirmed inferior domain event data.

19 Claims, 13 Drawing Sheets

(56) References Cited

OTHER PUBLICATIONS

Chae, Sangwon et al. "Predicting Infectious Disease Using Deep Learning and Big Data," International Journal of Environmental Research and Public Health, vol. 15, No. 1596, (2018), pp. 1-20.
Engle, Robert. "GARCH 101: The Use of ARCH/GARCH Models in Applied Econometrics," Journal of Economic Perspectives, vol. 15, No. 4, (2001), pp. 157-168.
Feng, Yun et al. "A Unified Framework of Epidemic Spreading Prediction by Empirical Mode Decomposition-Based Ensemble Learning Techniques," IEEE Transactions on Computational Social Systems. May 24, 2019, vol. 6, No. 4, (10 pages). DOI: 10.1109/TCSS.2019.2915615.
Friedman, Jerome H. "Greedy Function Approximation: A Gradient Boosting Machine," IMS 1999 Reitz Lecture, Feb. 24, 1999, pp. 1-39.
Han, Barbara A. et al. "Rodent Reservoirs of Future Zoonotic Diseases," Proceedings of the National Academy of Sciences. Jun. 2, 2015, vol. 112, No. 22, pp. 7039-7044.
Huang, Norden E. et al. "The Empirical Mode Decomposition and the Hilbert Spectrum for Nonlinear and Non-Stationary Time Series Analysis," Proc. Royal Society London, vol. 454, (1998), pp. 903-995.
Husin NA, Salim N. "Modeling of Dengue Outbreak Prediction in Malaysia: A Comparison of Neural Network and Nonlinear Regression Model," In 2008 International Symposium on Information Technology, vol. 3, Aug. 26, 2008, pp. 1-4, IEEE.
Kane, Michael J et al. "Comparison of ARIMA and Random Forest Time Series Models for Prediction of Avian Influenza H5N1 Outbreaks," BMC Bioinformatics, vol. 15, No. 276, (2014), pp. 1-9.
Labate, Domenico et al. "Empirical Mode Decomposition vs. Wavelet Decomposition for the Extraction of Respiratory Signal From Single-Channel ECG: A Comparison," IEEE Sensors Journal, vol. 13, No. 7, Jul. 2013, pp. 2666-2674.
Liu, Yanping et al. "RBF Prediction Model Based on EMD for Forecasting GPS Precipitable Water Vapor and Annual Precipitation," Proceedings of the 2nd International Conference on Systems Engineering and Modeling (IDSEM-13), (2013), (5 pages).
Scholkopf, Bernard. "Support Vector Learning," Doctoral Dissertation, (1997), (145 pages). R. Oldenbourg Verlag, Munich, Germany.
Sharma, Vikash Chandra et al. "Ensemble Approach for Zoonotic Disease Forecasting Using Machine Learning Techniques," International Journal of Business Analytics and Intelligence, vol. 3, Issue 2, Oct. 2015, pp. 11-24.
Teodoro, Douglas et al. Empirical Mode Decomposition and K-Nearest Embedding Vectors for Timely Analyses of Antibiotic Resistance Trends, PloS One, vol. 8, No. 4:e61180, Apr. 2013, pp. 1-14.
The R Development Core Team, "R: A Language and Environment for Statistical Computing," Vienna: R Foundation for Statistical Computing, (2014), (2,673 pages), ISBN: 3-900051-07-0. [http://www.Rproject.org/].
Wu, Ming Chya et al. "Empirical Mode Decomposition and Synchrogram Approach to Cardiorespiratory Synchronization," Physical Review E., vol. 73, No. 5, No. 051917, May 24, 2006, pp. 1-11.
Zhu, Xiaojin et al. "Machine Learning for Zoonotic Emerging Disease Detection," In International Conference on Machine Learning. Proc. 2011 Workshop on Machine Learning for Global Challenges, (2011), (5 pages), University of Wisconsin-Madison.

\* cited by examiner

CROSS-GEOGRAPHICAL PREDICTIVE DATA ANALYSIS

BACKGROUND

Various embodiments of the present invention address technical challenges related to performing predictive data analysis. Various embodiments of the present invention address the shortcomings of existing predictive inference systems and disclose various techniques for efficiently and reliably performing predictive data analysis.

BRIEF SUMMARY

In general, embodiments of the present invention provide methods, apparatus, systems, computing devices, computing entities, and/or the like for performing cross-geographical predictive data analysis. Certain embodiments utilize systems, methods, and computer program products that predictive data analysis using superior domain event data forecasts for hierarchically superior geographic domains, inferior domain event data forecasts for hierarchically inferior geographic domains, superior domain input data simulations for hierarchically superior geographic domains, inferior domain input data simulations for hierarchically inferior geographic domains, inferior domain event prediction models, inferior domain event forecast confirmations, Gibbs-sampling-based Markov Chain Monte Carlo routines, empirical mode decompositions, zero-inflated Poisson models, and/or the like.

In accordance with one aspect, a method is provided. In one embodiment, the method comprises: determining, based at least in part on observed superior domain input data for a hierarchically superior geographic domain at an observation period and observed superior domain event data for the hierarchically superior geographic domain at the observation period, forecasted superior domain event data for the hierarchically superior geographic domain at a forecasting period, wherein each hierarchically superior geographic domain is associated with a plurality of hierarchically inferior geographic domains; for each hierarchically inferior geographic domain: (i) generating, based at least in part on observed inferior domain input data for the hierarchically inferior geographic domain at the observation period, an inferior domain event prediction model for the hierarchically inferior geographic domain, wherein the inferior domain event prediction model is configured to generate predicted events based at least in part on prediction input data, (ii) determining, based at least in part on the observed inferior domain input data and observed inferior domain event data for the hierarchically inferior geographic domain at the observation period, simulated inferior domain input data for the hierarchically inferior geographic domain at the forecasting period, and (iii) determining, based at least in part on the simulated inferior domain input data and using the inferior domain event prediction model, forecasted inferior domain event data for the hierarchically inferior geographic domain at the forecasting period; determining, for each hierarchically inferior geographic domain of the plurality of hierarchically inferior geographic domains and based at least in part on the forecasted inferior domain event data for the hierarchically inferior geographic domain, confirmed inferior domain event data for the hierarchically inferior geographic domain at the forecasting period; and performing one or more prediction-based actions based at least in part on each confirmed inferior domain event data.

In accordance with another aspect, a computer program product is provided. The computer program product may comprise at least one computer-readable storage medium having computer-readable program code portions stored therein, the computer-readable program code portions comprising executable portions configured to: determine, based at least in part on observed superior domain input data for a hierarchically superior geographic domain at an observation period and observed superior domain event data for the hierarchically superior geographic domain at the observation period, forecasted superior domain event data for the hierarchically superior geographic domain at a forecasting period, wherein each hierarchically superior geographic domain is associated with a plurality of hierarchically inferior geographic domains; for each hierarchically inferior geographic domain: (i) generate, based at least in part on observed inferior domain input data for the hierarchically inferior geographic domain at the observation period, an inferior domain event prediction model for the hierarchically inferior geographic domain, wherein the inferior domain event prediction model is configured to generate predicted events based at least in part on prediction input data, (ii) determine, based at least in part on the observed inferior domain input data and observed inferior domain event data for the hierarchically inferior geographic domain at the observation period, simulated inferior domain input data for the hierarchically inferior geographic domain at the forecasting period, and (iii) determine, based at least in part on the simulated inferior domain input data and using the inferior domain event prediction model, forecasted inferior domain event data for the hierarchically inferior geographic domain at the forecasting period; determine, for each hierarchically inferior geographic domain of the plurality of hierarchically inferior geographic domains and based at least in part on the forecasted inferior domain event data for the hierarchically inferior geographic domain, confirmed inferior domain event data for the hierarchically inferior geographic domain at the forecasting period; and perform one or more prediction-based actions based at least in part on each confirmed inferior domain event data.

In accordance with yet another aspect, an apparatus comprising at least one processor and at least one memory including computer program code is provided. In one embodiment, the at least one memory and the computer program code may be configured to, with the processor, cause the apparatus to: determine, based at least in part on observed superior domain input data for a hierarchically superior geographic domain at an observation period and observed superior domain event data for the hierarchically superior geographic domain at the observation period, forecasted superior domain event data for the hierarchically superior geographic domain at a forecasting period, wherein each hierarchically superior geographic domain is associated with a plurality of hierarchically inferior geographic domains; for each hierarchically inferior geographic domain: (i) generate, based at least in part on observed inferior domain input data for the hierarchically inferior geographic domain at the observation period, an inferior domain event prediction model for the hierarchically inferior geographic domain, wherein the inferior domain event prediction model is configured to generate predicted events based at least in part on prediction input data, (ii) determine, based at least in part on the observed inferior domain input data and observed inferior domain event data for the hierarchically inferior geographic domain at the observation period, simulated inferior domain input data for the hierarchically inferior geographic domain at the forecasting period, and (iii) determine, based at least in part on the simulated inferior domain input data and using the inferior domain event prediction model, forecasted inferior domain event data for the hierarchically inferior geographic domain at the forecasting period; determine, for each hierarchically inferior geographic domain of the plurality of hierarchically inferior geographic domains and based at least in part on the forecasted inferior domain event data for the hierarchically inferior geographic domain, confirmed inferior domain event data for the hierarchically inferior geographic domain at the forecasting period; and perform one or more prediction-based actions based at least in part on each confirmed inferior domain event data.

BRIEF DESCRIPTION OF THE DRAWINGS

Figure 1:
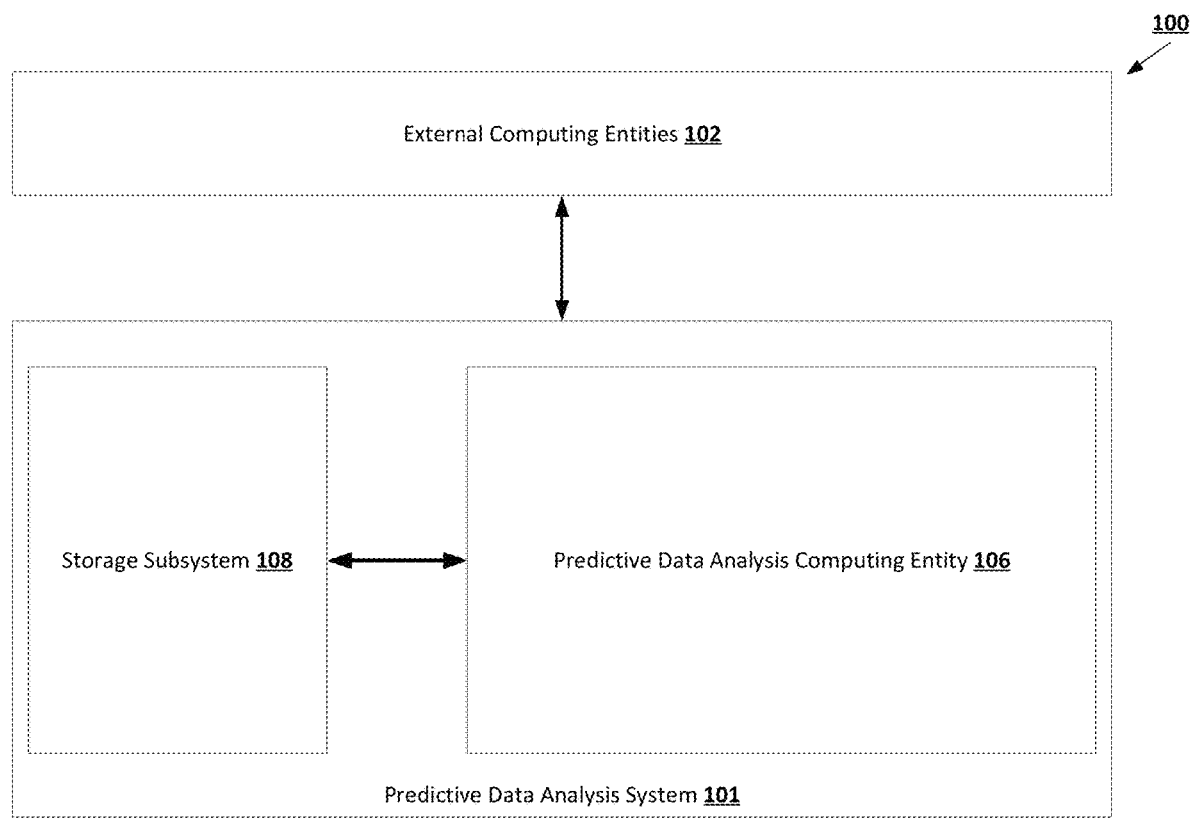

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
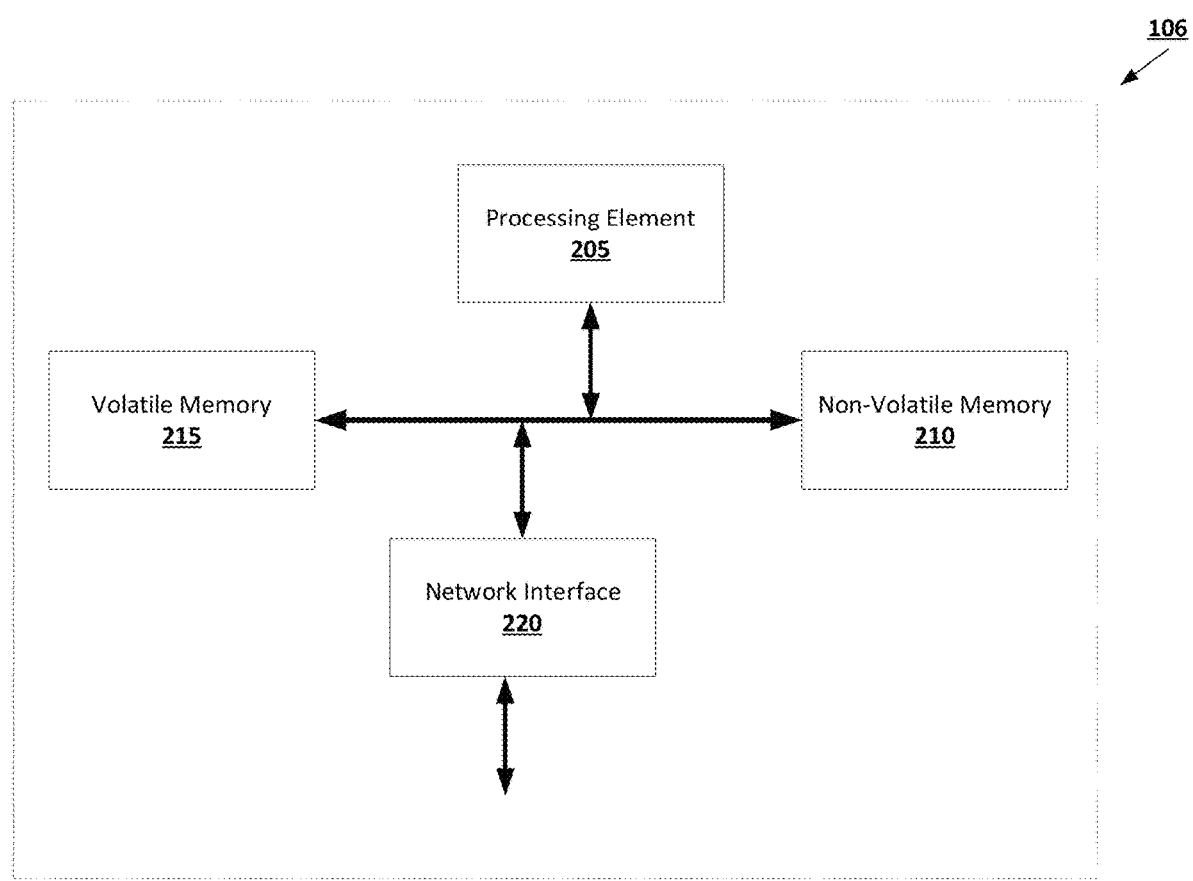

FIG. 2 provides an example predictive data analysis computing entity in accordance with some embodiments discussed herein.

Figure 3:
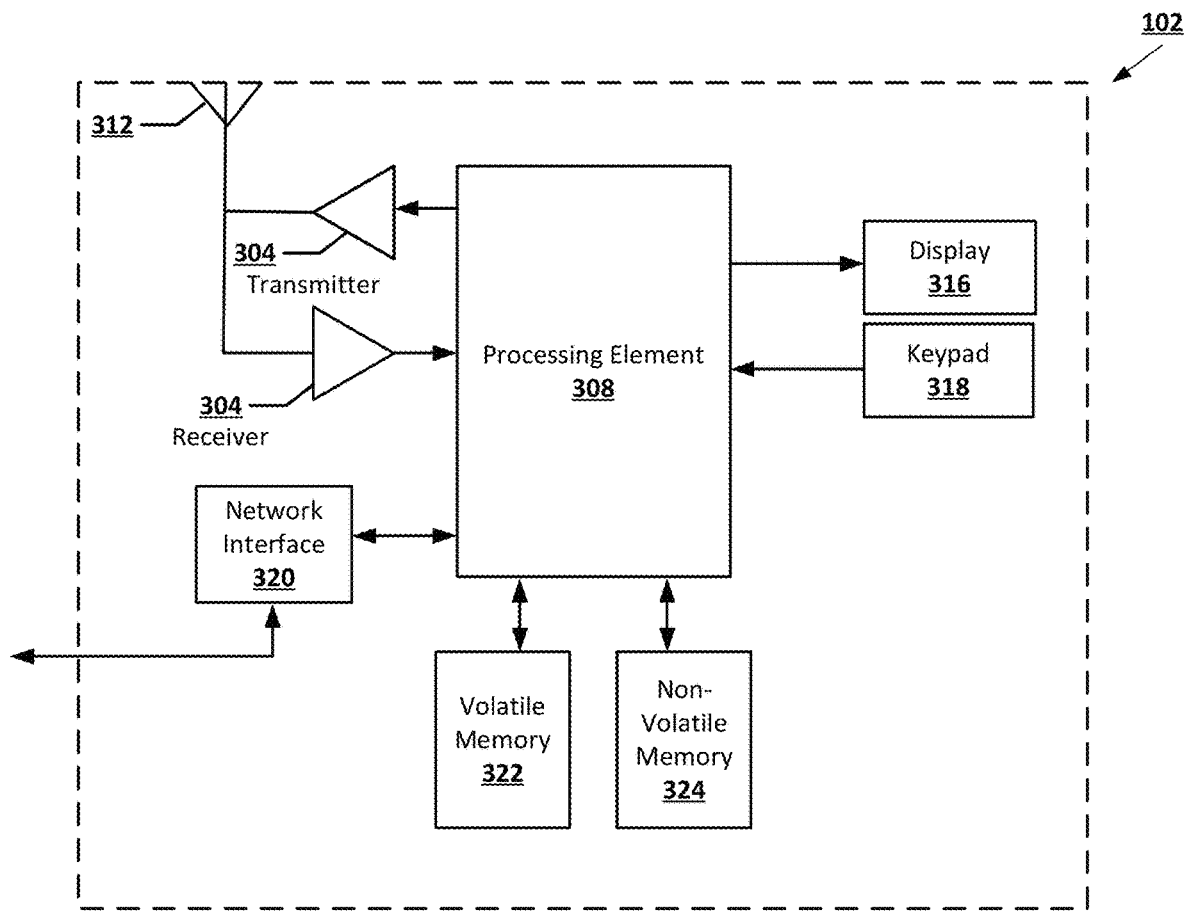

FIG. 3 provides an example external computing entity in accordance with some embodiments discussed herein.

Figure 4:
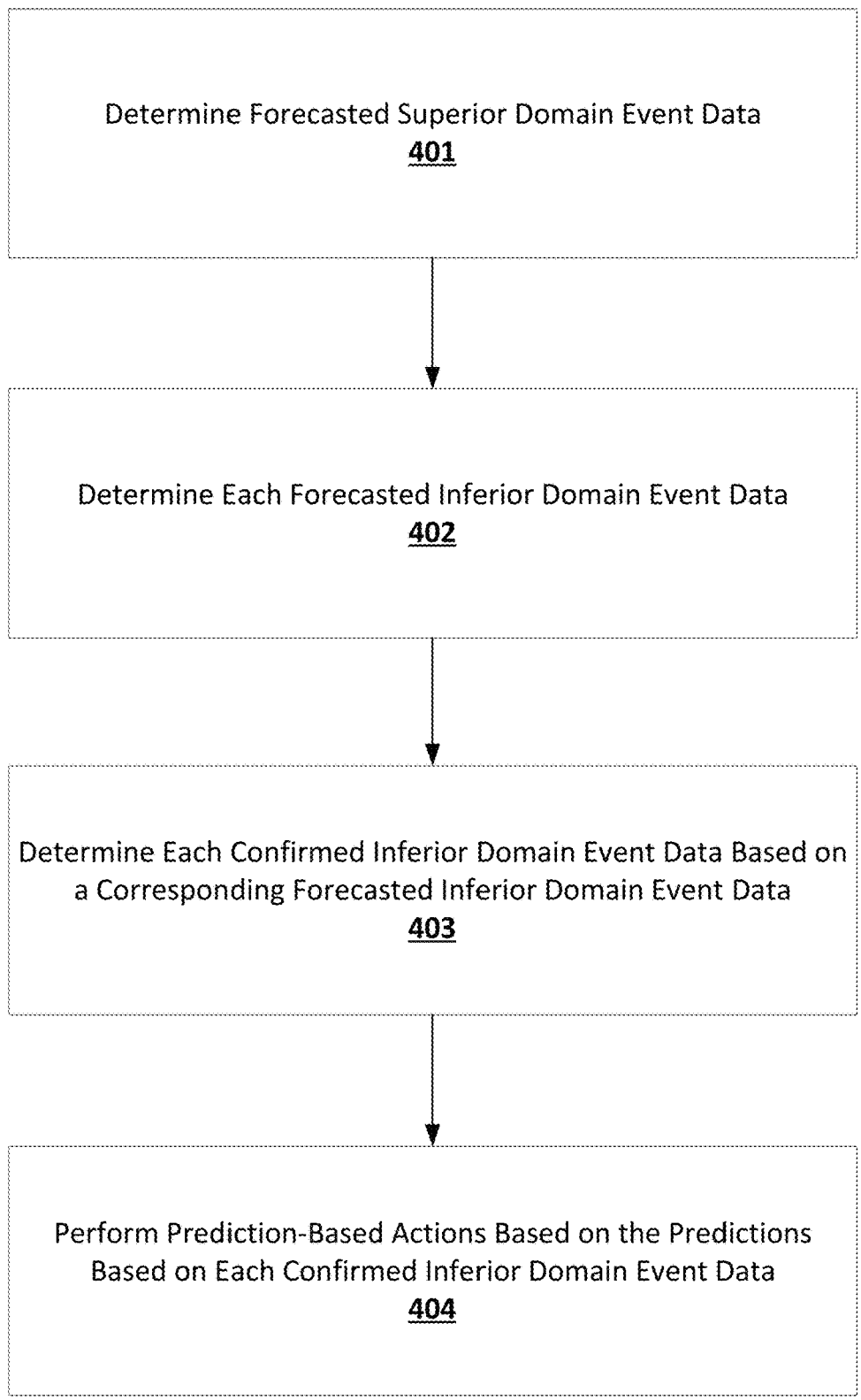

FIG. 4 is a flowchart diagram of an example process for performing cross-geographical event prediction in accordance with some embodiments discussed herein.

Figure 5:
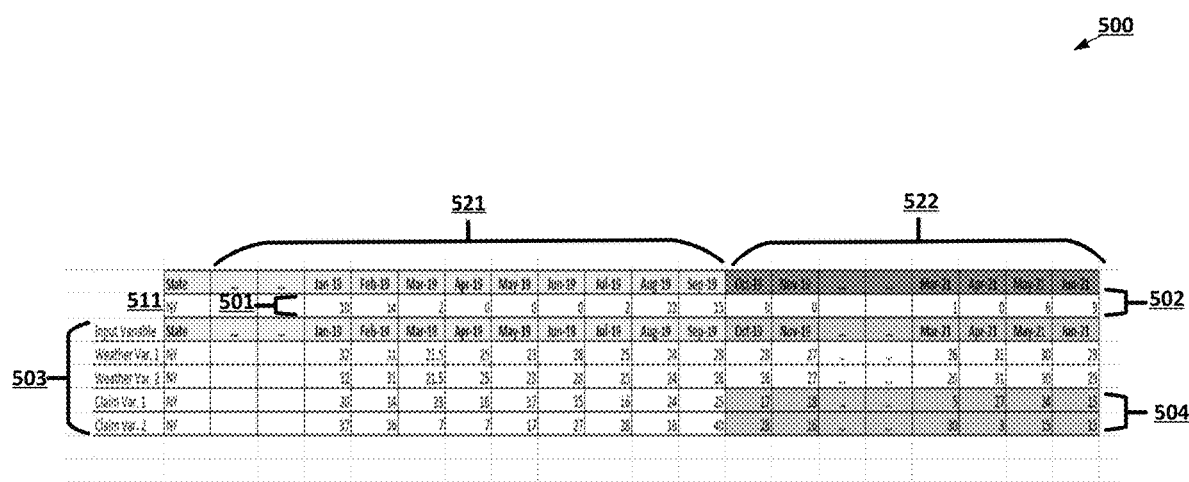

FIG. 5 provides an operational example of a superior-domain event forecasting data object in accordance with some embodiments discussed herein.

Figure 6:
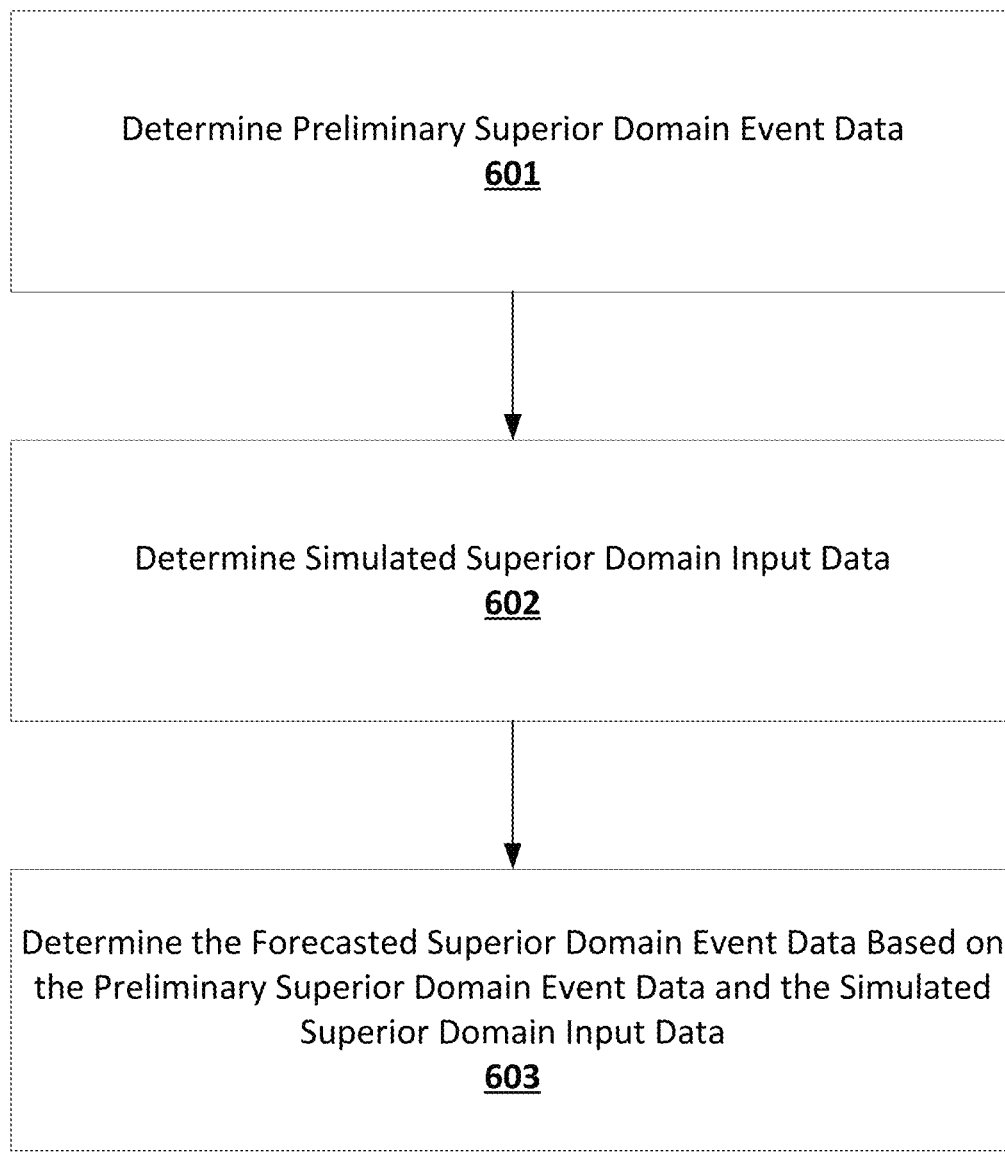

FIG. 6 is a flowchart diagram of an example process for determining forecasted superior domain event data for a hierarchal superior geographic domain at a forecasting period in accordance with some embodiments discussed herein.

Figure 7:
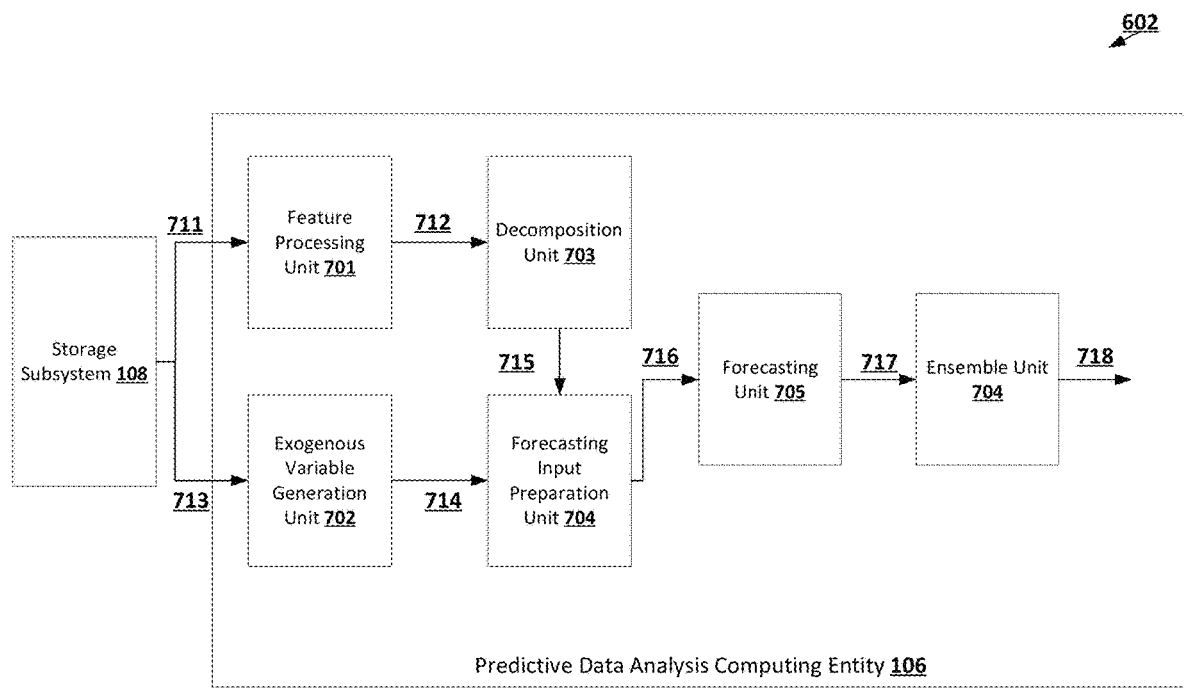

FIG. 7 is a data flow diagram of an example process for determining preliminary superior domain event data for a hierarchal superior geographic domain at a forecasting period in accordance with some embodiments discussed herein.

Figure 8:
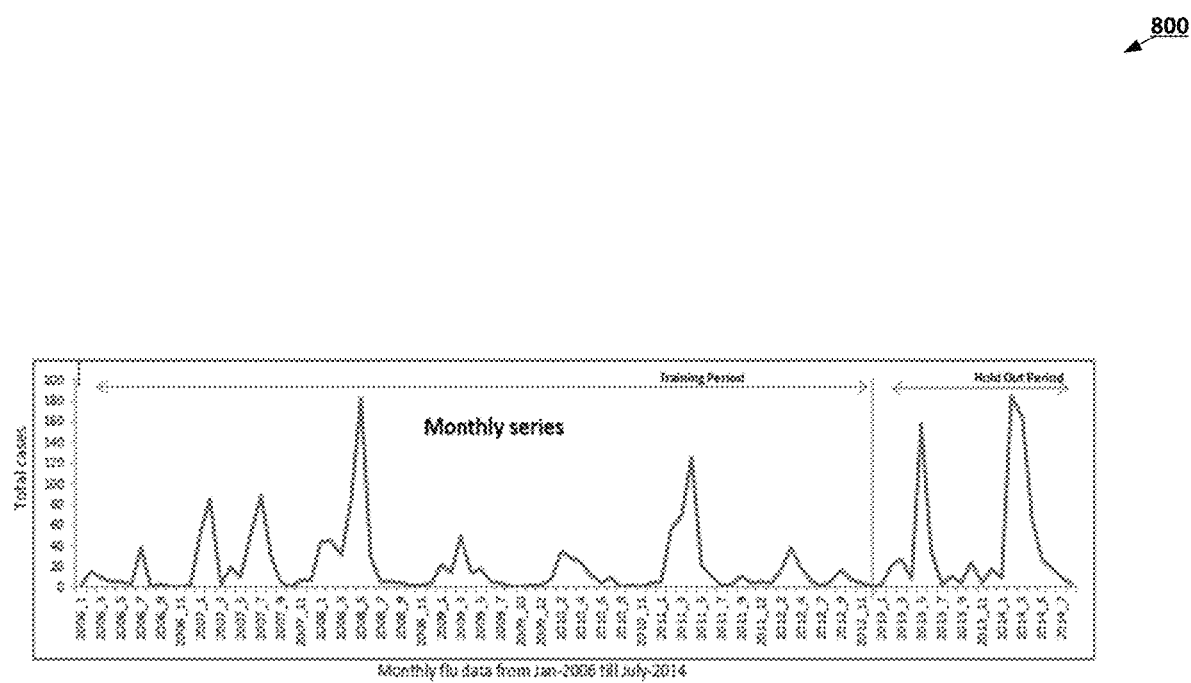

FIG. 8 provides an operational example of timeseries event data in accordance with some embodiments discussed herein.

Figure 9:
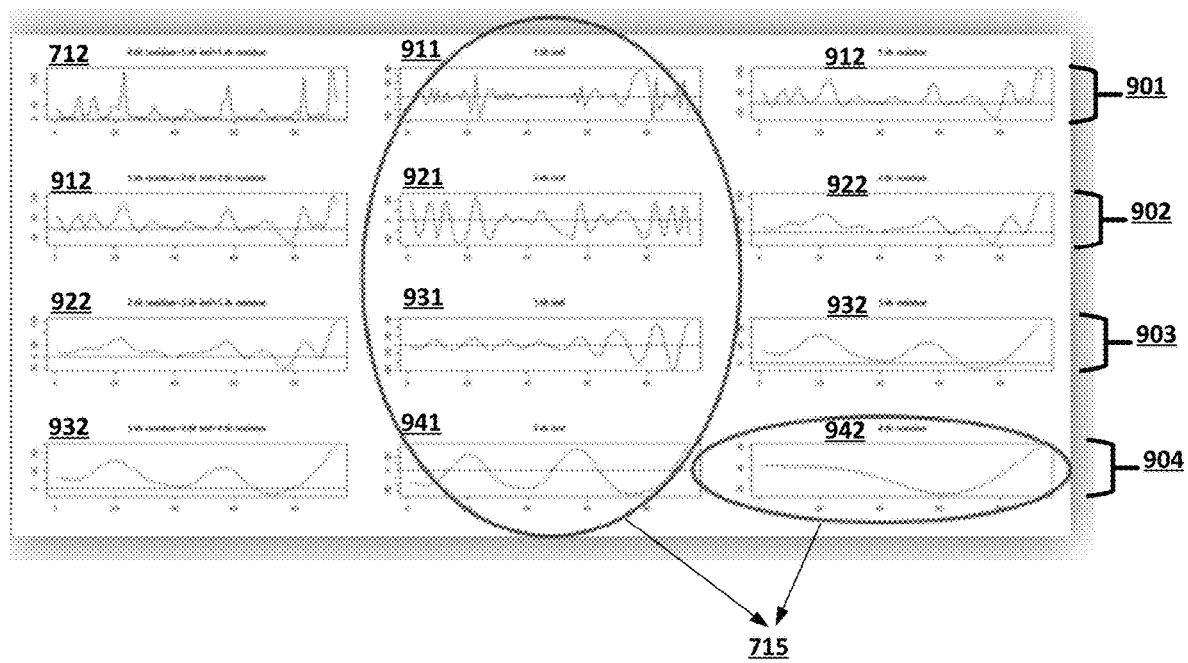

FIG. 9 provides an operational example of performing empirical mode decomposition in accordance with some embodiments discussed herein.

Figure 10:
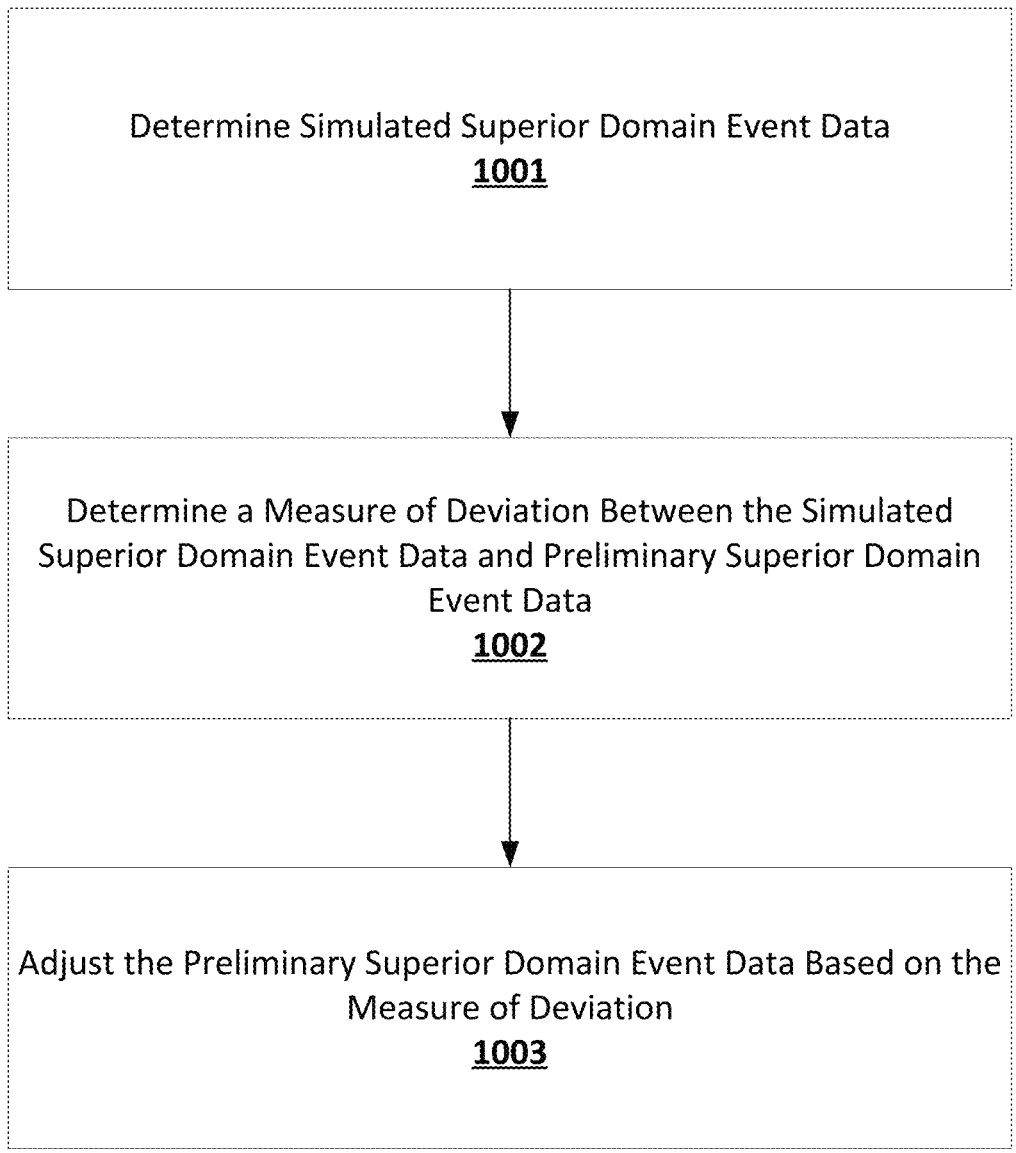

FIG. 10 is a flowchart diagram of an example process for determining forecasted superior domain event data for a hierarchically superior geographic domain at a forecasting period in accordance with some embodiments discussed herein.

Figure 11:
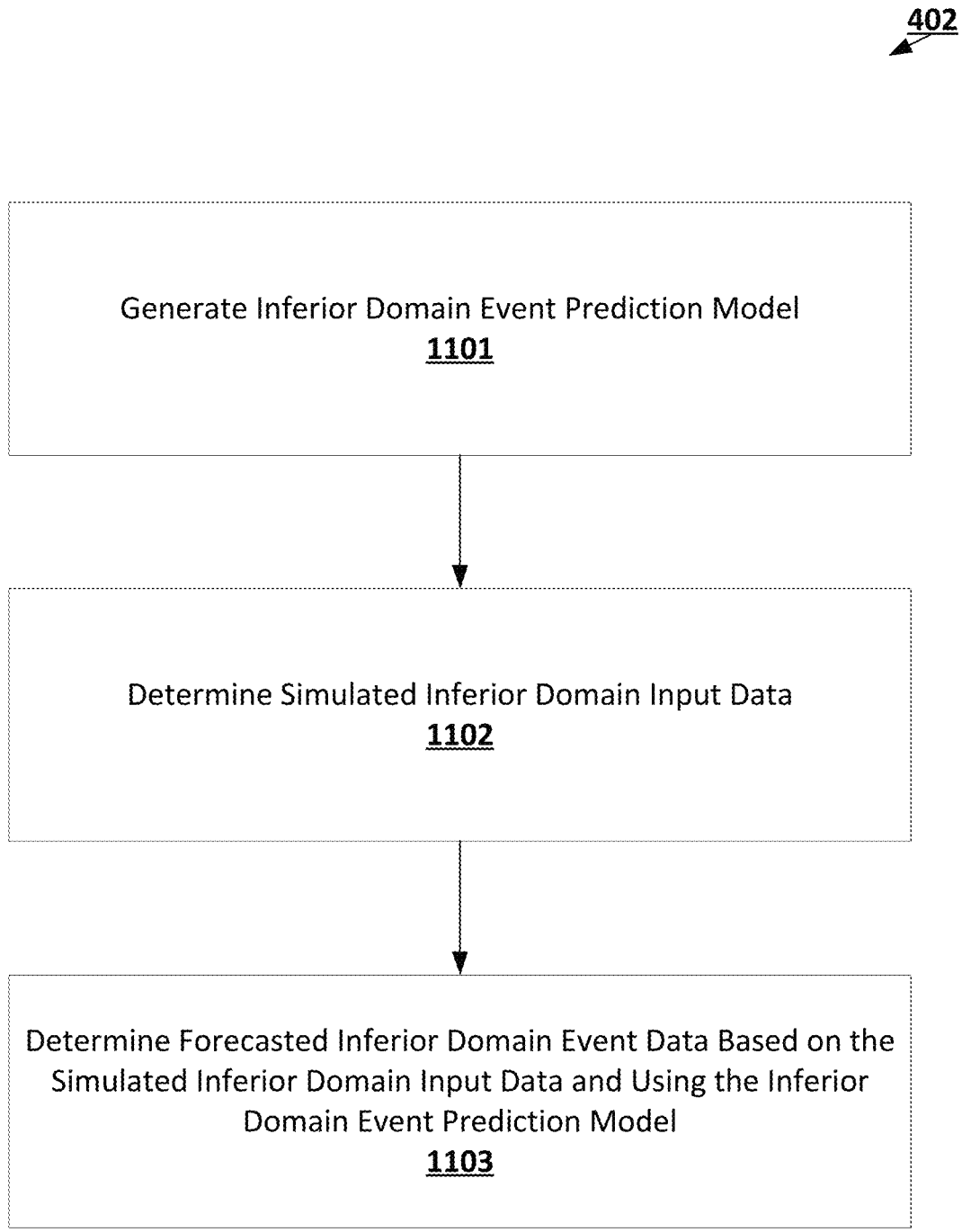

FIG. 11 is a flowchart diagram of an example process for determining forecasted inferior domain event data for a hierarchically inferior geographic domain at a forecasting period in accordance with some embodiments discussed herein.

Figure 12:
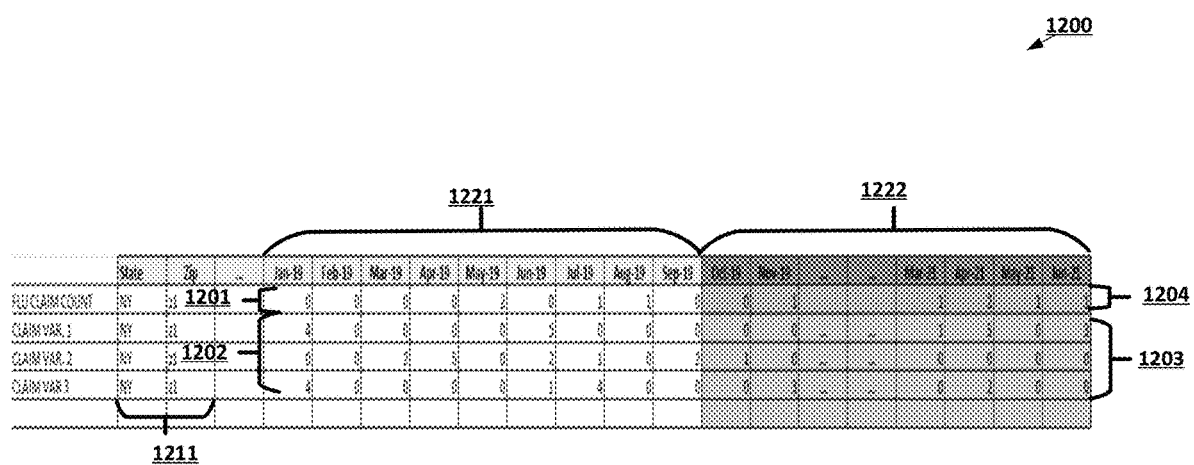

FIG. 12 provides an operational example of an inferior-domain event forecasting data object in accordance with some embodiments discussed herein.

Figure 13:
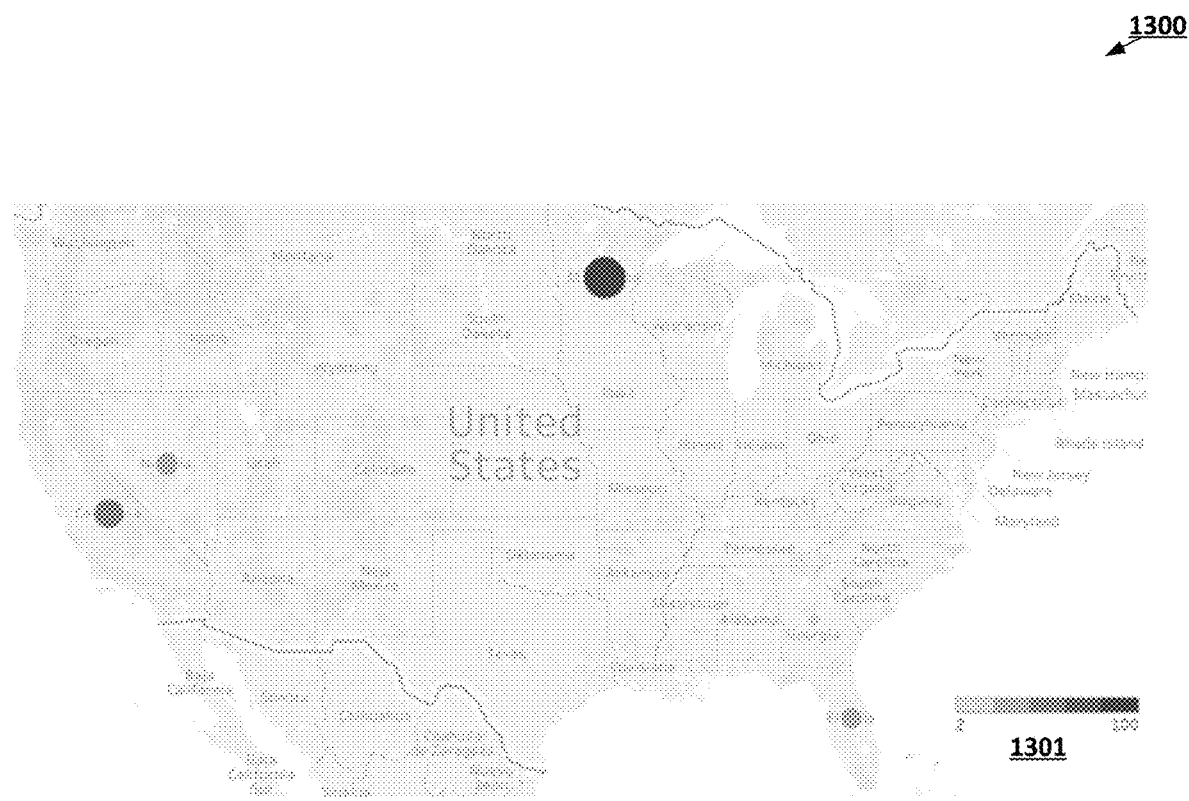

FIG. 13 provides an operational example of a cross-geographical event prediction user interface in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention improve the field of predictive data analysis by decreasing the amount of data needed to be transmitted from client devices to predictive data analysis servers in order to perform cross-geographical predictive data analysis. For example, various embodiments of the present invention disclose techniques for reducing the amount of predictive input data needed for performing predictive data analysis by generating parts of the predictive input data using simulation. In an illustrative example, when performing zoonotic disease outbreak forecasting, a predictive data analysis server can utilize state-wide predictive input data (e.g., state-wide outbreak data, state-wide weather data, state-wide insurance claim filing data, and/or the like) to simulate district-wide predictive input data for districts within the state (e.g., district-wide outbreak data, district-wide weather data, district-wide insurance claim filing data, and/or the like). By reducing the amount of predictive input data needed for performing predictive data analysis, various embodiments of the present invention reduce the number of data transmissions from client devices to predictive data analysis servers needed in order to perform predictive data analysis, thus increasing network transmission efficiency of distributed predictive data analysis architectures.

Furthermore, reducing the number of data transmissions from client devices to predictive data analysis servers needed in order to perform predictive data analysis also decreases chances of data loss due to network hardware errors and/or network software errors, thus increasing reliability and effectiveness of distributed predictive data analysis architectures in addition to increasing network transmission efficiency of distributed predictive data analysis architectures. Moreover, various embodiments of the present invention introduce data forecasting techniques that have, in experimental observations by the inventors, outperformed various state-of-the-art data forecasting techniques, especially with regard to long-term trend forecasting and/or forecasting of rare but costly events such as zoonotic disease outbreaks. Accordingly, various embodiments of the present invention make important technical contributions to the field of predictive data analysis and to improving the efficiency and reliability of various existing predictive data analysis frameworks, including various existing distributed predictive data analysis frameworks.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for performing cross-geographical predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a predictive data analysis task is generating health-related predictions (e.g., district-wide zoonotic disease outbreak predictions) based at least in part on at least one of past state-wide disease-outbreak data, past state-wide weather data, past state-wide insurance-claim filing data, past district-wide disease-outbreak data, past district-wide weather data, past district-wide insurance-claim filing data, state-wide weather forecasts, district-wide weather forecasts, and/or the like.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate the generated predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

EXEMPLARY PREDICTIVE DATA ANALYSIS COMPUTING ENTITY

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

FIG. 4 is a flowchart diagram of an example process 400 for performing cross-geographical event prediction. Via the various steps/operations of the process 400, the predictive data analysis computing entity 106 can efficiently and effectively perform cross-geographical event predictions without requiring input data for hierarchically inferior geographic domains (e.g., districts within a state). In doing so, the process 400 can reduce the amount of input data transmission from client devices (e.g., external devices 102A-C) to predictive data analysis servers (e.g., the predictive data analysis system 101) required in order to enable the noted predictive data analysis servers to perform cross-geographical event prediction with greater network. Accordingly, the process 400 can enhance the network efficiency of remote predictive data analysis servers.

The process 400 begins at step/operation 401 when the predictive data analysis computing entity 106 determines forecasted superior domain event data for the hierarchically superior geographic domain at a forecasting period. In some embodiments, a geographic domain is a data object that describes one or more geographic regions (e.g., one or more continents, one or more countries, one or more provinces, one or more districts, one or more cities, one or more postal code areas, one or more neighborhoods, one or more streets, and/or the like). A hierarchically superior geographic domain may be any geographic domain that comprises one or more hierarchically inferior geographic domains. An example of a hierarchically superior geographic domain may be a state that includes one or more hierarchically inferior geographic domains such as one or more intra-state districts.

In some embodiments, forecasted superior domain event data is a data object that describes a predicted likelihood of occurrence and/or a predicted frequency of occurrence of a corresponding event type in a corresponding forecasting period (e.g., a future period as of the time of a forecast) for a corresponding hierarchically superior geographic domain. For example, particular forecasted superior domain event data may describe the predicted frequency of filing of medical claims related to a particular zoonotic disease in a corresponding state in a future period. In the noted example, the state is a hierarchically superior geographic domain associated with the noted exemplary forecasted superior domain event data, while filing of a medical claim related to a particular zoonotic disease (e.g., bird flu) is an event type associated with the noted exemplary forecasted superior domain event data.

In some embodiments, the forecasted superior domain event data is determined based at least in part on at least one of the following: (i) observed superior domain input data for the hierarchically superior geographic domain at an observation period, and (ii) observed superior domain event data for the hierarchically superior geographic domain at the observation period. The observed superior domain input data may be a data object that describes observed values of one or more data variables (e.g., one or more weather-describing variables, one or more disease-outbreak-frequency-describing variables, one or more claim-fling-frequency-describing variables, and/or the like) associated with a hierarchically superior geographic domain (e.g., a state) during an observation period (e.g., a past period as of the time of a forecast). For example, particular observed superior domain input data may describe the mean temperature of a corresponding state during each month of a multi-month observation period. As another example, particular observed superior domain input data may describe the aggregate number of flu patients in a corresponding state during each month of a multi-month observation period. As a further example, particular observed superior domain input data may describe the aggregate number of flu medical claims filed in a corresponding state during each month of a multi-month observation period.

The observed superior domain event data may be a data object that describes an observed likelihood of occurrence and/or an observed frequency of occurrence of a corresponding event type in a corresponding observation period (e.g., a past period as of the time of a forecast). For example, particular observed superior domain event data may describe the observed frequency of filing of medical claims related to a particular zoonotic disease in a corresponding state in the past n unit periods (e.g., months, weeks, quarters, days, and/or the like), where n may be a predefined and/or a trained hyperparameter of the predictive data analysis computing entity 106. In the noted example, the state is a hierarchically superior geographic domain associated with the noted exemplary observed superior domain event data, while filing of a medical claim related to a particular zoonotic disease (e.g., bird flu) is an event type associated with the noted exemplary observed superior domain event data.

Operational examples of forecasted superior domain event data 502, observed superior domain input data 503, and observed superior domain event data 501 are depicted in FIG. 5, which provides an operational example of a superior-domain event forecasting data object 500. As further depicted in the superior-domain event forecasting data object 500 of FIG. 5, the forecasted superior domain event data 502, the observed superior domain input data 503, and the observed superior domain event data 501 are associated with the hierarchically superior geographic domain 511 which describes the state of New York.

As further depicted in FIG. 5, the forecasted superior domain event data 502 is associated with a forecasting period 522, while the observed superior domain input data 503 and the observed superior domain event data 501 are associated with the observation period 521. The observation period 521 and the forecasting period 522 each include various unit time periods (e.g., months, weeks, quarters, days, and/or the like].

Moreover, as further depicted in FIG. 5, the superior-domain event forecasting data object 500 further includes simulated superior domain input data 504 associated with the hierarchically superior geographic domain 511 at the forecasting period 522. Various aspects of the simulated superior domain input data 504 are described in greater detail below, e.g., in relation to step/operation 602 of FIG. 6.

In some embodiments, step/operation 401 can be performed in accordance with the process depicted in FIG. 6, which is a flowchart diagram of an example process for determining forecasted superior domain event data for a particular superior geographic domain at a particular forecasting period. The process depicted in FIG. 6 begins at step/operation 601 when the predictive data analysis computing entity 106 determines preliminary superior domain event data for the hierarchically superior geographic domain at the forecasting period based at least in part on the observed superior domain input data for the hierarchically superior geographic domain at the observation period (e.g., the observed superior domain input data 503 in FIG. 5) and the observed superior domain event data for the hierarchically superior geographic domain at the observation period (e.g., the observed superior domain event data 501 in FIG. 5).

In some embodiments, to determine the preliminary superior domain event data for the hierarchically superior geographic domain, the predictive data analysis computing entity 106 utilizes one or more a preliminary machine learning framework comprising one or more inter-connected preliminary machine learning models trained to determine the preliminary superior domain event data based at least in part on the observed superior domain event data and the observed superior domain event data, where the one or more inter-connected preliminary machine learning models may be configured to decompose a predictive signal generated based at least in part on the observed superior domain event data to generate decomposed signals, process the observed superior domain event data to generate exogenous variables, and process the decomposed signals and the exogenous variables to generate preliminary superior domain event data. In some embodiments, the inter-connected preliminary machine learning models may include an ensemble learning model configured to aggregate predictive outputs of at least some of the noted inter-connected preliminary machine learning models in order to generate a unified predictive output for the preliminary machine learning framework.

In some embodiments, step/operation 601 may be performed in accordance with the process depicted in FIG. 7, which is a data flow diagram of an example process for determining the preliminary superior domain event data. The process depicted in FIG. 7 begins when a feature processing unit 701 of the predictive data analysis computing entity 106 retrieves event data 711 associated with a particular event type (e.g., a zoonotic disease outbreak frequency data) and a particular period of time (e.g., a first sub-period of the observation period) from the storage subsystem 108. The feature processing unit 701 then processes the retrieved event data 711 to generate a timeseries distribution 712 for the retrieved event data 711. In some embodiments, to generate the timeseries distribution 712 based at least in part on the retrieved event data 711, the feature processing unit 701 performs one or more univariate timeseries analyses on the event data 711. Examples of univariate timeseries analyses include autoregressive (AR) analyses, autoregressive moving average (ARMA) analyses, autoregressive integrated moving average (ARIMA) analyses, Holt's Winter's smoothing analyses, mean-absolute-percentage-error-based analyses, autoregressive conditional heteroscedasticity (ARCH) analyses, and generalized autoregressive conditional heteroscedasticity (GARCH) analyses.

In some embodiments, the event data 711 utilized by the feature processing unit 701 to generate the timeseries distribution 712 include a timeseries signal determined based at least in part on the observed superior domain event data. For example, the event data 711 may be determined based at least in part on data indicating a number of occurrences of a particular event (e.g., outbreaks of a particular disease) over a period of time in relation to a corresponding hierarchically superior geographic domain. In some embodiments, the event data 711 include timeseries event data. An operational example of timeseries event data 800 is depicted in FIG. 8. As depicted in the FIG. 8, the timeseries event data 800 includes a timeseries signal that comprises timeseries data describing incidences of flu virus in a corresponding state during a particular period. In some embodiments, the timeseries distribution 712 is a refined timeseries signal generated based at least in part on the raw timeseries signal of the event data 711, where the timeseries signal refinement may be performed using one or more univariate timeseries analyses.

The process depicted in FIG. 7 continues when an exogenous variable generation unit 702 of the predictive data analysis computing entity 106 retrieves input data 713 for the particular period of time and processes the retrieved input data 713 in order to generate exogenous variables 714. In some embodiments, input data 713 are determined based at least in part on at least one of the observed superior domain input data and the observed superior domain event data. For example, the input data 713 may describe at least one of the number of occurrences of a particular event in a corresponding hierarchically superior geographic domain over a period of time, observed weather patterns of the corresponding hierarchically superior geographic domain over a period of time, insurance claim filings of the corresponding hierarchically superior geographic domain over a period of time, and/or the like.

In some embodiments, the exogenous variables 714 include aggregate measurements for each defined subperiod of a particular time period associated with the input data 713. For example, the exogenous variables 714 may include, for each subperiod (e.g., month) of the particular period: (i) the raw number of occurrences of a particular event (e.g., outbreaks of a particular disease) during the subperiod; (ii) one or more seasonally-adjusted numbers of occurrences of a particular event during the subperiod (where each seasonally-adjusted number of occurrence may be associated with a particular seasonality measure, e.g., a three-month seasonality measure, a six-month seasonality measure, a twelve-month seasonality measure, and/or the like); (iii) a measure of trend and/or rate of change of occurrence of the event during the subperiod; (iv) raw maximum temperature measure and/or raw minimum temperature measure during the subperiod; (v) one or more lagged maximum temperature measures and/or lagged minimum temperature measures during the subperiod (where each lagged temperature measure may be associated with a lag interval, e.g., a lag interval of one, a lag interval of two, a lag interval of three, a lag interval of five, and/or the like); (vi) raw maximum humidity measure and/or raw minimum humidity measure during the subperiod; (vii) one or more lagged maximum humidity measures and/or lagged minimum humidity measures during the subperiod; (viii) raw maximum precipitation measure and/or raw minimum precipitation measure during the subperiod; (ix) one or more lagged maximum precipitation measures and/or lagged minimum precipitation measures during the subperiod; (x) a count of insurance claims for a particular set of medical claims associated with a particular event during the subperiod, where the claims have been filed in a corresponding state associated with the exogenous variables 714; (xi) a count of insurance claims for a particular set of medical claims associated with a particular event during the subperiod, where the claims have been filed in a state deemed to be a bordering state of the corresponding state associated with the exogenous variables 714; (xii) a count of insurance plans and/or insurance members associated with a particular set of medical claims associated with a particular event during the subperiod in a corresponding state associated with the exogenous variables 714; (xiii) a count of insurance plans and/or insurance members associated with the particular set of medical claims associated with a particular event during a subperiod in the states deemed to be bordering a corresponding state associated with the exogenous variables 714; and/or the like.

The process depicted in FIG. 7 continues when a decomposition unit 703 of the predictive data analysis computing entity 106 utilizes the timeseries distribution 712 to generate decomposed timeseries distributions 715. To do so, the decomposition unit 703 may perform empirical mode decomposition (EMD) on the timeseries distribution 712. The decomposed timeseries distributions 715 may include a first number of intrinsic mode functions (IMF) distributions and an error distribution. Performing EMDs, IMF distributions, and error distributions are described in greater detail below. While various embodiments of the present invention discuss decomposing the timeseries distribution 712 using EMD, a person of ordinary skill in the relevant technical field will recognize that other decomposition techniques may also be utilized.

EMD may decompose an input timeseries distribution into IMF distributions that satisfy two criteria: (i) for each IFM distribution, the difference between number of the extrema values (i.e., both maxima values and minima values) defined by the IMF distribution and the number of zero values (i.e., zero-crossings) defined by the IMF distribution cannot differ by more than one; and (ii) for each IMF distribution, the mean value of the upper envelop of the IMF distribution and the lower envelop of the IMF distribution cannot be zero at any point in the domain of the IMF distribution. The EMD may be performed in accordance with a fundamental part of a Hilbert-Huang transform (HHT) process and may be configured to decompose given timeseries signal data that are not set analytically and are instead determined by analyzed sequences only.

In some embodiments, performing EMD comprises generating IMF distributions in a recursive manner until no new IMF distribution satisfying the above criteria can be generated, and subsequently generating an error distribution based at least in part on the residue of the noted recursive IMF distribution generation process. In some embodiments, performing EMD comprises generating IMF distributions in a qualified recursive manner until either no new IMF distribution satisfying the above criteria can be generated or until a predefined maximum number of IMF distributions (e.g., a maximum number of four IMF distributions) have been generated. At each iteration of IMF distribution generation process, the input to the iteration may be the residue of the timeseries distribution 712 after extracting the previously-generated IMF distributions.

An operational example of performing EMD using a qualified recursion with a defined maximum IMF distribution count of four is depicted in FIG. 9. As depicted in FIG. 9, during a first EMD iteration 901, the timeseries distribution 712 is processed to generate a first IMF distribution 911 and a first iteration residue 912. Then, during a second EMD iteration 902, the first iteration residue 912 is processed to generate a second IMF distribution 921 and a second iteration residue 922. Afterward, during a third EMD iteration 903, the second iteration residue 922 is processed to generate a third IMF distribution 931 and a third iteration residue 932. Subsequently, during a fourth EMD iteration 904, the third iteration residue 932 is processed to generate a fourth IMF distribution 941 and a fourth iteration residue 942. Finally, because after the fourth EMD iteration 904 the maximum number of four IMF distributions have been generated, the decomposed timeseries distributions 715 are generated based at least in part on the four IMF distributions 911, 921, 931, and 941 and the fourth iteration residue 942, which is adopted as an error distribution value.

Returning to FIG. 7, the depicted process continues when the forecast input preparation unit 704 of the predictive data analysis computing entity 106 merges the exogenous variables 714 and the decomposed timeseries distributions 715 to generate a forecast input 716. In some embodiments, the forecast input 716 includes a formatted forecast input for each machine learning model utilized by the forecast unit 705 of the predictive data analysis computing entity 106, where each formatted forecast input for a machine learning model has been generated in accordance with at least some of the exogenous variables 714 and/or at least some of the decomposed timeseries distributions 715 in accordance with an input structure of the corresponding machine learning model.

The process depicted in FIG. 7 continues when the forecast unit 705 of the predictive data analysis computing entity 106 processes the forecast input 716 in accordance with a plurality of machine learning models to generate per-model predictive outputs 717. Each machine learning model of the plurality of machine learning model may be configured to process corresponding formatted forecast input in the forecast input 716 that is associated with the machine learning model to generate a corresponding per-model predictive output. Examples of suitable machine learning models that may be utilized by the forecast unit 705 include Random Forest models, Support Vector Regression models, Gradient Boosting Machine models, and Long Short Term Memory models.

The process depicted in FIG. 7 continues when the ensemble unit 706 of the predictive data analysis computing entity 106 combines the per-model predictive outputs 717 to generate the preliminary superior domain event data 718. The preliminary superior domain event data 718 may be determined based at least in part on a measure of distribution of the per-model predictive outputs 717, such as weighted average of the per-model predictive outputs 717, where the weights used to determine the weighted average may be statically-defined values, dynamically-determinable values, values determined using one or more training processes, and/or the like. While various embodiments of the present invention describe the machine learning component of generating the preliminary superior domain event data as being performed by ensembles of two or more machine learning models, a person of ordinary skill in the relevant technical field will recognize that in some embodiments any number of machine learning models may be utilized and that in some embodiments there may be no ensemble models to generate ensembled output based on outputs of two or more machine learning models.

In some embodiments, the preliminary superior domain event data include various per-ensemble prediction values and/or may be determined based at least in part on various per-ensemble prediction values, where each per-ensemble value may be determined based at least in part on aggregating output of a corresponding subset of the plurality of machine learning models. For example, the preliminary superior domain event data may be determined by aggregating a first per-ensemble value determined based at least in part on the per-model predictive outputs 717 of the Support Vector Regression model and the Random Forest model, a second per-ensemble value determined based at least in part on the per-model predictive outputs 717 of Gradient Boosting Machine model and the Random Forest model, and the per-model predictive outputs 717 of the Long Short Term Memory model.

Returning to FIG. 6, at step/operation 602, the predictive data analysis computing entity 106 determines simulated superior domain input data for the hierarchically superior geographic domain at the forecasting period based at least in part on the observed superior domain input data. The simulated superior domain input data may be a data object that describes simulated values of one or more data variables (e.g., one or more weather-describing variables, one or more disease-outbreak-frequency-describing variables, one or more claim-fling-frequency-describing variables, and/or the like) associated with a hierarchically superior geographic domain (e.g., a state) during a forecasting period (e.g., a future period as of the time of a forecast).

In some embodiments, simulated data variables characterizing the simulated superior domain input data may be the same as the observed data variables characterizing the observed superior domain input data. In some embodiments, simulated data variables characterizing the simulated superior domain input data may include a subset of the observed data variables characterizing the observed superior domain input data that are not deemed to have sufficiently reliable forecasts. For example, the simulated data variables characterizing the simulated superior domain input data may exclude weather-describing variables to the extent there are reliable weather forecast data related to the weather-describing variables for the forecasting period. In some embodiments, as depicted in the superior-domain event forecasting data object 500 of FIG. 5, the simulated superior domain input data 504 include claim-filing-describing variables (i.e., Claim Var. 1 and Claim Var. 2) but not weather-describing variables (i.e., Weather Var. 1 and Weather Var. 2).

In some embodiments, the simulated superior domain input data are generated using a simulation method, such as a Monte Carlo simulation method. In some embodiments, the simulated superior domain input data are generated using a Markov Chain Monte Carlo simulation method. In some embodiments, the simulated superior domain input data are generated using a Markov Chain Monte Carlo simulation method with Gibbs sampling. The Markov Chain Monte Carlo simulation method utilized to generate simulated superior domain input data may process the observed superior domain input data based at least in part on random samples from the observed superior domain input data and by using a probability density function that is proportional to a function mapping the observed superior domain input data to the observed superior domain event data.

In some embodiments, determining the simulated superior domain input data comprises determining, using a Gibbs-sampling-based Markov Chain Monte Carlo routine, a superior-domain-related probability distribution of the observed superior domain input data; determining inferred superior domain input data for the hierarchically superior geographic domain at the forecasting period based at least in part on the superior-domain-related probability distribution; and determining the simulated superior domain input data based at least in part on the inferred superior domain input data.

At step/operation 603, the predictive data analysis computing entity 106 determines the forecasted superior domain event data based at least in part on the preliminary superior domain event data and the simulated superior domain input data. In some embodiments, to determine the forecasted superior domain event data, the predictive data analysis computing entity 106 first determines a simulated superior domain event data by processing the simulated superior domain input data (e.g., in accordance with the predictive model described in relation to FIG. 7). Afterward, the predictive data analysis computing entity 106 adjusts the preliminary superior domain event data based at least in part on the simulated superior domain event data, e.g., based at least in part on a measure of deviation between the simulated superior domain event data and the preliminary superior domain event data. In some embodiments, adjusting the preliminary superior domain event data based at least in part on the simulated superior domain event data is configured to provide a tradeoff between the predictive inference performed at step/operation 401 and the predictive inference performed to determine the simulated superior domain event data.

In some embodiments, step/operation 603 may be performed in accordance with the process depicted in FIG. 10, which is a flowchart diagram of an example process for determining the forecasted superior domain event data based at least in part on the preliminary superior domain event data and the simulated superior domain input data. The process depicted in FIG. 10 begins at step/operation 1001 when the predictive data analysis computing entity 106 determines simulated superior domain event data based at least in part on the simulated superior domain input data.

In some embodiments, to determine the simulated superior domain event data, the predictive data analysis computing entity 106 processes the simulated superior domain input data in accordance with one or more machine learning models (e.g., in accordance with the one or more machine learning models defined by the predictive model described in relation to FIG. 7 and/or in accordance with the predictive model described in relation to FIG. 7).

At step/operation 1002, the predictive data analysis computing entity 106 determines a measure of deviation between the simulated superior domain event data and a preliminary superior domain event data (e.g., a preliminary superior domain event data determined in accordance with the techniques described in relation to step/operation 601 of FIG. 6). In some embodiments, the measure of deviation is a raw measure of difference between the simulated superior domain event data and the preliminary superior domain event data. In some embodiments, the measure of deviation is a measure of difference between the simulated superior domain event data and the preliminary superior domain event data in an instant case relative to an overall distribution of the simulated superior domain event data and the preliminary superior domain event data across a group of cases including the instant case. In some embodiments, the measure of deviation is a measure of difference between the simulated superior domain event data and the preliminary superior domain event data in an instant case relative to an overall distribution of the simulated superior domain event data and the preliminary superior domain event data across a group of cases excluding the instant case.

At step/operation 1003, the predictive data analysis computing entity 106 adjusts the preliminary superior domain event data based at least in part on the measure of deviation to determine the forecasted superior domain event data. In some embodiments, adjusting the preliminary superior domain event data based at least in part on the simulated superior domain event data is configured to provide a tradeoff between the predictive inference performed at step/operation 401 and the predictive inference performed to determine the simulated superior domain event data. In some embodiments, determining the noted tradeoff can be performed based at least in part on a weight value for each of the predictive inference performed at step/operation 401 and the predictive inference performed to determine the simulated superior domain event data, where the weight values may be determined based at least in part on user-supplied values, system configuration values, trained parameter values, and/or the like.

Returning to FIG. 4, at step/operation 402, the predictive data analysis computing entity 106 determines a forecasted inferior domain event data for each hierarchically inferior geographic domain associated with the hierarchically superior geographic domain. In some embodiments, forecasted inferior domain event data is a data object that describes a predicted likelihood of occurrence and/or a predicted frequency of occurrence of a corresponding event type in a corresponding forecasting period (e.g., a future period as of the time of a forecast) for a corresponding hierarchically inferior geographic domain. For example, particular forecasted inferior domain event data may describe the predicted frequency of filing of medical claims related to a particular zoonotic disease in a corresponding intra-state district in a future period. In the noted example, the intra-state district is a hierarchically inferior geographic domain associated with the noted exemplary forecasted inferior event data, while filing of a medical claim related to a particular zoonotic disease (e.g., bird flu) is an event type associated with the noted exemplary forecasted inferior domain event data.

In some embodiments, step/operation 402 may be performed in accordance with the process depicted in FIG. 11, which is a flowchart diagram of an example process for determining forecasted inferior domain event data for a particular hierarchically inferior geographic domain. The process depicted in FIG. 11 begins at step/operation 1101 when the predictive data analysis computing entity 106 generates an inferior domain event prediction model for the hierarchically inferior geographic domain based at least in part on observed inferior domain input data for the hierarchically inferior geographic domain at the observation period, where the inferior domain event prediction model is configured to generate predicted events based at least in part on prediction input data.

In some embodiments, determining the inferior domain event prediction model for a hierarchically inferior geographic domain of the plurality of geographic domains comprises determining a zero-inflated Poisson model data object for the observed inferior domain input data for the hierarchically inferior geographic domain and determining the inferior domain event prediction model based at least in part on the zero-inflated Poisson model data object. In some embodiments, to determine the inferior domain event prediction model, the predictive data analysis computing entity 106 processes the observed inferior domain input data for the hierarchically inferior geographic domain (e.g., zip-code-level medical claim information data for a particular category of medical claims) in order to offset the noted observed inferior domain input data based on observed inferior domain event data for the hierarchically inferior geographic domain (e.g., zip-code-level medical claim count data for a particular category of medical claims). Thereafter, the predictive data analysis computing entity 106 fits a zero-inflated count model on the data generated by offsetting the observed inferior domain input data in order to generate the inferior domain event prediction model.

In some embodiments, the observed inferior domain input data may be a data object that describes observed values of one or more data variables (e.g., one or more weather-describing variables, one or more disease-outbreak-frequency-describing variables, one or more claim-fling-frequency-describing variables, and/or the like) associated with a hierarchically inferior geographic domain (e.g., an intra-state district) during an observation period (e.g., a past period as of the time of a forecast). For example, particular observed inferior domain input data may describe the mean temperature of a corresponding intra-state district during each month of a multi-month observation period. As another example, particular observed inferior domain input data may describe the aggregate number of flu patients in a corresponding intra-state district during each month of a multi-month observation period. As a further example, particular observed inferior domain input data may describe the aggregate number of flu medical claims filed in a corresponding intra-state district during each month of a multi-month observation period.

In some embodiments, the inferior domain event prediction model for a corresponding hierarchically inferior geographic domain is configured to generate predicted events based at least in part on prediction input data related to the corresponding hierarchically inferior geographic domain. For example, the inferior domain event prediction model may be configured to generate forecasted inferior domain event data for the hierarchically inferior geographic domain at the forecasting period based at least in part on simulated inferior domain input data and using the inferior domain event prediction model.

In some embodiments, the inferior domain event prediction model may describe a distribution of one or more random variables describing likelihood of occurrence of one or more events (e.g., likelihood of outbreaks of one or more diseases) to particular input variables (e.g., particular input variables determined based at least in part on observed inferior domain input data). An example of an inferior domain event prediction model may be a model that predicts likely number of medical claim filings associated with a particular medical condition in an intra-state district based at least in part on at least one of weather data for the intra-state district, disease outbreak data for the intra-state district, overall claim filing for the intra-state district. If the medical particular condition is occasionally very rare (e.g., is a zoonotic disease), the inferior domain event prediction model may utilize a zero-inflated distribution, such as a zero-inflated Poisson distribution.

At step/operation 1102, the predictive data analysis computing entity 106 determines simulated inferior domain input data for the hierarchically inferior geographic domain at the forecasting period based at least in part on the observed inferior domain input data and observed inferior domain event data for the hierarchically inferior geographic domain at the observation period. The simulated inferior domain input data may be a data object that describes simulated values of one or more data variables (e.g., one or more weather-describing variables, one or more disease-outbreak-frequency-describing variables, one or more claim-fling-frequency-describing variables, and/or the like) associated with a hierarchically inferior geographic domain (e.g., an intra-state district) during a forecasting period (e.g., a future period as of the time of a forecast).

In some embodiments, simulated data variables characterizing the simulated inferior domain input data may be the same as the observed data variables characterizing the observed inferior domain input data. In some embodiments, simulated data variables characterizing the simulated inferior domain input data may include a subset of the observed data variables characterizing the observed inferior domain input data that are not deemed to have sufficiently reliable forecasts. For example, the simulated data variables characterizing the simulated inferior input data may exclude weather-describing variables to the extent there are reliable weather forecast data related to the weather-describing variables for the forecasting period.

The observed inferior domain event data may be a data object that describes a predicted likelihood of occurrence and/or a predicted frequency of occurrence of a corresponding event type in a corresponding observation period (e.g., a past period as of the time of a forecast). For example, particular observed inferior domain event data may describe the predicted frequency of filing of medical claims related to a particular zoonotic disease in a corresponding intra-state district in the past n months, where n may be a predefined and/or a trained hyperparameter of the predictive data analysis computing entity 106. In the noted example, the intra-state district is a hierarchically superior geographic domain associated with the noted exemplary observed inferior domain event data, while filing of a medical claim related to a particular zoonotic disease (e.g., bird flu) is an event type associated with the noted exemplary observed inferior domain event data.

In some embodiments, the simulated inferior domain input data are generated using a simulation method, such as a Monte Carlo simulation method. In some embodiments, the simulated inferior domain input data are generated using a Markov Chain Monte Carlo simulation method with Gibbs sampling. The Markov Chain Monte Carlo simulation method utilized to generate simulated inferior domain input data may process the observed inferior domain input data based at least in part on random samples from the observed inferior domain input data using a probability density function that is proportional to a function mapping the observed inferior domain input data to the observed inferior domain event data.

In some embodiments, determining the simulated inferior domain input data comprises determining, using a Gibbs-sampling-based Markov Chain Monte Carlo routine, an inferior-domain-related probability distribution of the observed inferior domain input data; determining inferred inferior domain input data for the hierarchically inferior geographic domain at the forecasting period based at least in part on the inferior-domain-related probability distribution; and determining the simulated inferior domain input data based at least in part on the inferred inferior domain input data.

Operational examples of observed inferior domain event data 1201, observed inferior domain input data 1202, simulated inferior domain input data 1203, and forecasted inferior domain event data 1204 are depicted in FIG. 12, which provides an operational example of an inferior-domain event forecasting data object 1200. As depicted in the inferior-domain event forecasting data object 1200 of FIG. 12, the observed inferior domain event data 1201, the observed inferior domain input data 1202, the simulated inferior domain input data 1203, and the forecasted inferior domain event data 1204 are associated with the hierarchically inferior geographic domain 1211 which describes a district within the state of New York. As further depicted in the inferior-domain event forecasting data object 1200 of FIG. 12, the observed inferior domain event data 1201 and the observed inferior domain input data 1202 are both associated with the observation period 1221, while the simulated inferior domain input data 1203 and the forecasted inferior domain event data 1204 are both associated with the forecasting period 1222.

Returning to FIG. 11, at step/operation 1103, the predictive data analysis computing entity 106 determines the forecasted inferior domain event data for the hierarchically inferior geographic domain at the forecasting period based at least in part on the simulated inferior domain input data and using the inferior domain event prediction model. In some embodiments, the predictive data analysis computing entity 106 processes input data generated based at least in part on the simulated inferior domain input data using the inferior domain event prediction model and generates the forecasted inferior domain event data for the hierarchically inferior geographic domain based at least in part on the output of the processing. In some embodiments, determining the forecasted inferior domain event data for a hierarchically inferior geographic domain of the plurality of geographic domains comprises processing the simulated inferior domain input data for the hierarchically inferior geographic domain in accordance with the inferior domain event prediction model for the hierarchically inferior geographic domain to generate the forecasted inferior domain event data.

Returning to FIG. 4, at step/operation 403, the predictive data analysis computing entity 106 determines confirmed inferior domain event data for each hierarchically inferior geographic domain of the plurality of hierarchically inferior geographic domains based at least in part on the forecasted inferior domain event data for the hierarchically inferior geographic domain. In some embodiments, the predictive data analysis computing entity 106 determines confirmed inferior domain event data for each hierarchically inferior geographic domain based at least in part on each forecasted inferior domain event data for a hierarchically inferior geographic domain of the plurality of hierarchically inferior geographic domains associated a particular the hierarchically superior geographic domain (e.g., based at least in part on a sum of each forecasted inferior domain event data for a hierarchically inferior geographic domain of the plurality of hierarchically inferior geographic domains associated with a particular hierarchically superior geographic domain, such as a sum of predicted insurance claim filing counts for a particular disease for each intra-state district of a state).

In some embodiments, determining the confirmed inferior domain event data for each hierarchically inferior geographic domain of the plurality of hierarchically inferior geographic domains associated a particular the hierarchically superior geographic domain comprises aggregating each forecasted inferior domain event data for a hierarchically inferior geographic domain of the plurality of hierarchically inferior geographic domains to generate inferred superior domain event data for the particular superior geographic domain; determining a measure of deviation between the forecasted superior domain event data for the particular superior geographic domain and the inferred superior domain event data for the particular superior geographic domain; and determining each confirmed inferior domain event data based at least in part on the measure of deviation.

In some embodiments, determining each confirmed inferior domain event data based at least in part on the measure of deviation comprises adopting each forecasted inferior domain event data for a hierarchically inferior geographic domain of the plurality of inferior geographic domains associated with a particular superior geographic domain if the measure of deviation falls below a threshold measure of deviation. For example, the predictive data analysis computing entity 106 may adopt a set of per-district predicted insurance claim filing counts for a particular disease in each district of a state if the sum of the per-district predicted insurance claim filing counts is sufficiently similar to a per-state predicted insurance claim filing counts for the particular disease in the noted state.

In some embodiments, determining each confirmed inferior domain event data based at least in part on the measure of deviation comprises adjusting at least one forecasted inferior domain event data for a hierarchically inferior geographic domain of the plurality of inferior geographic domains associated with a particular superior geographic domain based at least in part on the magnitude of the measure of deviation. For example, the predictive data analysis computing entity 106 may adjust each forecasted inferior domain event data for a hierarchically inferior geographic domain of the plurality of inferior geographic domains associated with a particular superior geographic domain in accordance with outputs of an adjustment model, where the adjustment model is configured to process the measure of deviation to generate an adjustment value for each forecasted inferior domain event data.

At step/operation 404, the predictive data analysis computing entity 106 performs one or more prediction-based actions based at least in part on each confirmed inferior domain event data. Examples of prediction-based actions include automated emergency declaration actions, automated implementation of precautionary actions, automated hospital preparation actions, automated insurance workforce management operational management actions, automated insurance server load balancing actions, automated call center preparation actions, automated hospital preparation actions, automated insurance plan pricing actions, automated insurance plan update actions, and/or the like.

In some embodiments, the one or more prediction-based actions comprises detecting an emergency condition associated with an event type associated with the cross-geographical event prediction based at least in part on each confirmed inferior domain event data; and, in response to detecting the emergency condition, generating one or more emergency event outbreak notifications for the event type. In some embodiments, the one or more prediction-based actions comprise detecting an emergency condition associated with an event type associated with the cross-geographical event prediction based at least in part on each confirmed inferior domain event data; and, in response to detecting the emergency condition, performing one or more service center operational load balancing operations for the event type.

In some embodiments, one or more prediction-based actions comprise determining, based at least in part on confirmed inferior domain event data, a confirmed inferior domain event prediction for each hierarchically inferior geographic domain of the plurality of hierarchically inferior geographic domains; and generating a cross-geographical event prediction user interface that displays, for each hierarchically inferior geographic domain of the plurality of hierarchically inferior geographic domains, the confirmed inferior domain event prediction for the hierarchically inferior geographic domain in association with a geographic region placement indication for the hierarchically inferior geographic domain.

An operational example of a cross-geographical event prediction user interface 1300 is presented in FIG. 13. As depicted in FIG. 13, the cross-geographical event prediction user interface 1300 indicates predicted likelihood of event occurrences (e.g., calculated based at least in part on confirmed inferior domain event predictions) for each intra-state district within the United States using coloring schemes described by the guide user interface element 1301 for the cross-geographical event prediction user interface 1300. While various embodiments of the present invention discuss cross-geographical event prediction user interfaces including per-inferior-domain event likelihood values (e.g., per-district event likelihood values), a person of ordinary skill in the relevant technology will recognize that cross-geographical event prediction user interfaces may include per-superior-state event likelihood values (e.g., per-state event likelihood values) in addition to or instead of per-inferior-domain event likelihood values.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing cross-geographical event prediction, the computer-implemented method comprising:

determining, based at least in part on observed superior domain input data for a hierarchically superior geographic domain at an observation period and observed superior domain event data for the hierarchically superior geographic domain at the observation period, forecasted superior domain event data for the hierarchically superior geographic domain at a forecasting period, wherein each hierarchically superior geographic domain is associated with a plurality of hierarchically inferior geographic domains;

for each hierarchically inferior geographic domain:
  generating, based at least in part on observed inferior domain input data for the hierarchically inferior geographic domain at the observation period, an inferior domain event prediction model for the hierarchically inferior geographic domain, wherein the inferior domain event prediction model is configured to generate predicted events based at least in part on prediction input data,
  determining, based at least in part on the observed inferior domain input data and observed inferior domain event data for the hierarchically inferior geographic domain at the observation period, simulated inferior domain input data for the hierarchically inferior geographic domain at the forecasting period, and
  determining, based at least in part on the simulated inferior domain input data and using the inferior domain event prediction model, forecasted inferior domain event data for the hierarchically inferior geographic domain at the forecasting period by processing the simulated inferior domain input data in accordance with the inferior domain event prediction model to generate the forecasted inferior domain event data;

determining, for each hierarchically inferior geographic domain of the plurality of hierarchically inferior geographic domains and based at least in part on the forecasted inferior domain event data for the hierarchically inferior geographic domain, confirmed inferior domain event data for the hierarchically inferior geographic domain at the forecasting period; and performing one or more prediction-based actions based at least in part on the confirmed inferior domain event data.

2. The computer-implemented method of claim 1, wherein determining the forecasted superior domain event data comprises:
  determining, based at least in part on the observed superior domain input data and the observed superior domain event data, preliminary superior domain event data for the hierarchically superior geographic domain at the forecasting period;
  determining, based at least in part on the observed superior domain input data, simulated superior domain input data for the hierarchically superior geographic domain at the forecasting period; and
  determining the forecasted superior domain event data based at least in part on the preliminary superior domain event data and the simulated superior domain input data.

3. The computer-implemented method of claim 2, wherein determining the preliminary superior domain event data comprises:
  determining a timeseries distribution based at least in part on the observed superior domain event data;
  determining one or more exogenous variables based at least in part on the observed superior domain input data;

performing an empirical mode decomposition on the timeseries distribution to generate a group of decomposed timeseries distributions, wherein the group of decomposed timeseries distributions comprise a first number of intrinsic mode function distributions and an error distribution;

processing the observed superior domain input data and the group of decomposed timeseries distributions using a plurality of machine learning models, wherein each machine learning model of the plurality of machine learning models is configured to process the group of decomposed timeseries distributions and the one or more exogenous variables to generate a per-model preliminary event data object for the machine learning model; and determining, based at least in part on each per-model preliminary event data for a machine learning model of the plurality of machine learning models and using an ensemble model, the preliminary superior domain event data.

4. The computer-implemented method of claim 2, wherein determining the simulated superior domain input data comprises:

determining, using a Gibbs-sampling-based Markov Chain Monte Carlo routine, a superior-domain-related probability distribution of the observed superior domain input data;

determining inferred superior domain input data for the hierarchically superior geographic domain at the forecasting period based at least in part on the superior-domain-related probability distribution; and determining the simulated superior domain input data based at least in part on the inferred superior domain input data.

5. The computer-implemented method of claim 2, wherein determining the forecasted superior domain event data based at least in part on the preliminary superior domain event data and the simulated superior domain input data comprises:

determining simulated superior domain event data based at least in part on the simulated superior domain input data;

determining a measure of deviation between the simulated superior domain event data and the preliminary superior domain event data; and adjusting the preliminary superior domain event data based at least in part on the measure of deviation to determine the forecasted superior domain event data.

6. The computer-implemented method of claim 1, wherein determining the inferior domain event prediction model for a hierarchically inferior geographic domain of the plurality of hierarchically inferior geographic domains comprises:

determining a zero-inflated Poisson model data object for the observed inferior domain input data for the hierarchically inferior geographic domain; and determining the inferior domain event prediction model based at least in part on the zero-inflated Poisson model data object.

7. The computer-implemented method of claim 1, wherein determining the simulated inferior domain input data for a hierarchically inferior geographic domain of the plurality of hierarchically inferior geographic domains comprises:

determining, using a Gibbs-sampling-based Markov Chain Monte Carlo routine, an inferior-domain-related probability distribution of the observed inferior domain input data for the hierarchically inferior geographic domain; and determining the simulated inferior domain input data based at least in part on the inferior-domain-related probability distribution.

8. The computer-implemented method of claim 1, wherein determining each confirmed inferior domain event data comprises:

aggregating each forecasted inferior domain event data for a hierarchically inferior geographic domain of the plurality of hierarchically inferior geographic domains to generate inferred superior domain event data for the hierarchically superior geographic domain;

determining a measure of deviation between the forecasted superior domain event data and the inferred superior domain event data; and determining each confirmed inferior domain event data based at least in part on the measure of deviation.

9. The computer-implemented method of claim 1, wherein the one or more prediction-based actions comprises:

detecting an emergency condition associated with an event type associated with the cross-geographical event prediction based at least in part on each confirmed inferior domain event data; and in response to detecting the emergency condition, generating one or more emergency event outbreak notifications for the event type.

10. The computer-implemented method of claim 1, wherein the one or more prediction-based actions comprise:

detecting an emergency condition associated with an event type associated with the cross-geographical event prediction based at least in part on each confirmed inferior domain event data; and in response to detecting the emergency condition, performing one or more service center operational load balancing operations for the event type.

11. The computer-implemented method of claim 1, wherein the one or more prediction-based actions comprise:

determining, based at least in part on confirmed superior domain event data, a confirmed inferior domain event prediction for each hierarchically inferior geographic domain of the plurality of hierarchically inferior geographic domains; and generating a cross-geographical event prediction user interface that displays, for each hierarchically inferior geographic domain of the plurality of hierarchically inferior geographic domains, the confirmed inferior domain event prediction for the hierarchically inferior geographic domain in association with a geographic region placement indication for the hierarchically inferior geographic domain.

12. An apparatus for performing cross-geographical event prediction, the apparatus comprising at least one processor and at least one memory including program code, the at least one memory and the program code configured to, with the at least one processor, cause the apparatus to at least:

determine, based at least in part on observed superior domain input data for a hierarchically superior geographic domain at an observation period and observed superior domain event data for the hierarchically superior geographic domain at the observation period, forecasted superior domain event data for the hierarchically superior geographic domain at a forecasting period, wherein each hierarchically superior geographic domain is associated with a plurality of hierarchically inferior geographic domains;

for each hierarchically inferior geographic domain:
  generate, based at least in part on observed inferior domain input data for the hierarchically inferior geographic domain at the observation period, an inferior domain event prediction model for the hierarchically inferior geographic domain, wherein the inferior domain event prediction model is configured to generate predicted events based at least in part on prediction input data,
  determine, based at least in part on the observed inferior domain input data and observed inferior domain event data for the hierarchically inferior geographic domain at the observation period, simulated inferior domain input data for the hierarchically inferior geographic domain at the forecasting period, and
  determine, based at least in part on the simulated inferior domain input data and using the inferior domain event prediction model, forecasted inferior domain event data for the hierarchically inferior geographic domain at the forecasting period by processing the simulated inferior domain input data in accordance with the inferior domain event prediction model to generate the forecasted inferior domain event data;
determine, for each hierarchically inferior geographic domain of the plurality of hierarchically inferior geographic domains and based at least in part on the forecasted inferior domain event data for the hierarchically inferior geographic domain, confirmed inferior domain event data for the hierarchically inferior geographic domain at the forecasting period; and
perform one or more prediction-based actions based at least in part on each confirmed inferior domain event data.

13. The apparatus of claim 12, wherein determining the forecasted superior domain event data comprises:
  determining, based at least in part on the observed superior domain input data and the observed superior domain event data, preliminary superior domain event data for the hierarchically superior geographic domain at the forecasting period;
  determining, based at least in part on the observed superior domain input data, simulated superior domain input data for the hierarchically superior geographic domain at the forecasting period; and
  determining the forecasted superior domain event data based at least in part on the preliminary superior domain event data and the simulated superior domain input data.

14. The apparatus of claim 13, wherein determining the preliminary superior domain event data comprises:
  determining a timeseries distribution based at least in part on the observed superior domain event data;
  determining one or more exogenous variables based at least in part on the observed superior domain input data;
  performing an empirical mode decomposition on the timeseries distribution to generate a group of decomposed timeseries distributions, wherein the group of decomposed timeseries distributions comprise a first number of intrinsic mode function distributions and an error distribution;
  processing the observed superior domain input data and the group of decomposed timeseries distributions using a plurality of machine learning models, wherein each machine learning model of the plurality of machine learning models is configured to process the group of decomposed timeseries distributions and the one or more exogenous variables to generate a per-model preliminary event data object for the machine learning model; and
  determining, based at least in part on each per-model preliminary event data for a machine learning model of the plurality of machine learning models and using an ensemble model, the preliminary superior domain event data.

15. The apparatus of claim 13, wherein determining the simulated superior domain input data comprises:
  determining, using a Gibbs-sampling-based Markov Chain Monte Carlo routine, a superior-domain-related probability distribution of the observed superior domain input data;
  determining inferred superior domain input data for the hierarchically superior geographic domain at the forecasting period based at least in part on the superior-domain-related probability distribution; and
  determining the simulated superior domain input data based at least in part on the inferred superior domain input data.

16. The apparatus of claim 13, wherein determining the forecasted superior domain event data based at least in part on the preliminary superior domain event data and the simulated superior domain input data comprises:
  determining simulated superior domain event data based at least in part on the simulated superior domain input data;
  determining a measure of deviation between the simulated superior domain event data and the preliminary superior domain event data; and
  adjusting the preliminary superior domain event data based at least in part on the measure of deviation to determine the forecasted superior domain event data.

17. The apparatus of claim 12, wherein determining the inferior domain event prediction model for a hierarchically inferior geographic domain of the plurality of hierarchically inferior geographic domains comprises:
  determining a zero-inflated Poisson model data object for the observed inferior domain input data for the hierarchically inferior geographic domain; and
  determining the inferior domain event prediction model based at least in part on the zero-inflated Poisson model data object.

18. The apparatus of claim 12, wherein determining each confirmed inferior domain event data comprises:
  aggregating each forecasted inferior domain event data for a hierarchically inferior geographic domain of the plurality of hierarchically inferior geographic domains to generate inferred superior domain event data for the hierarchically superior geographic domain;
  determining a measure of deviation between the forecasted superior domain event data and the inferred superior domain event data; and
  determining each confirmed inferior domain event data based at least in part on the measure of deviation.

19. A computer program product for performing cross-geographical event prediction, the computer program product comprising at least one non-transitory computer-readable storage medium having computer-readable program code portions stored therein, the computer-readable program code portions configured to:
  determine, based at least in part on observed superior domain input data for a hierarchically superior geographic domain at an observation period and observed superior domain event data for the hierarchically superior geographic domain at the observation period, forecasted superior domain event data for the hierarchically superior geographic domain at a forecasting period, wherein each hierarchically superior geographic domain is associated with a plurality of hierarchically inferior geographic domains;

for each hierarchically inferior geographic domain:
- generate, based at least in part on observed inferior domain input data for the hierarchically inferior geographic domain at the observation period, an inferior domain event prediction model for the hierarchically inferior geographic domain, wherein the inferior domain event prediction model is configured to generate predicted events based at least in part on prediction input data,
- determine, based at least in part on the observed inferior domain input data and observed inferior domain event data for the hierarchically inferior geographic domain at the observation period, simulated inferior domain input data for the hierarchically inferior geographic domain at the forecasting period, and
- determine, based at least in part on the simulated inferior domain input data and using the inferior domain event prediction model, forecasted inferior domain event data for the hierarchically inferior geographic domain at the forecasting period by processing the simulated inferior domain input data in accordance with the inferior domain event prediction model to generate the forecasted inferior domain event data;

determine, for each hierarchically inferior geographic domain of the plurality of hierarchically inferior geographic domains and based at least in part on the forecasted inferior domain event data for the hierarchically inferior geographic domain, confirmed inferior domain event data for the hierarchically inferior geographic domain at the forecasting period; and perform one or more prediction-based actions based at least in part on each confirmed inferior domain event data.

* * * * *